May 1, 1923.
A. E. BRIGHT
WAGON ATTACHMENT
Filed Aug. 10, 1922
1,453,910
2 Sheets-Sheet 1
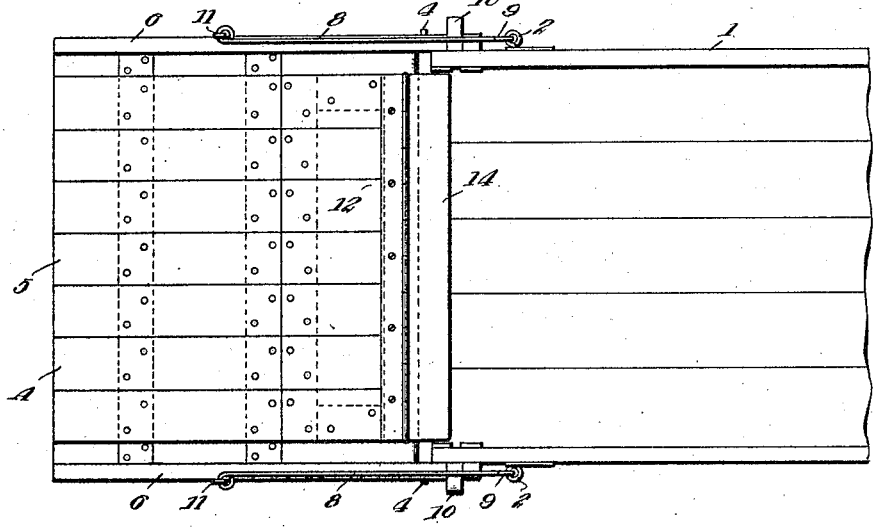
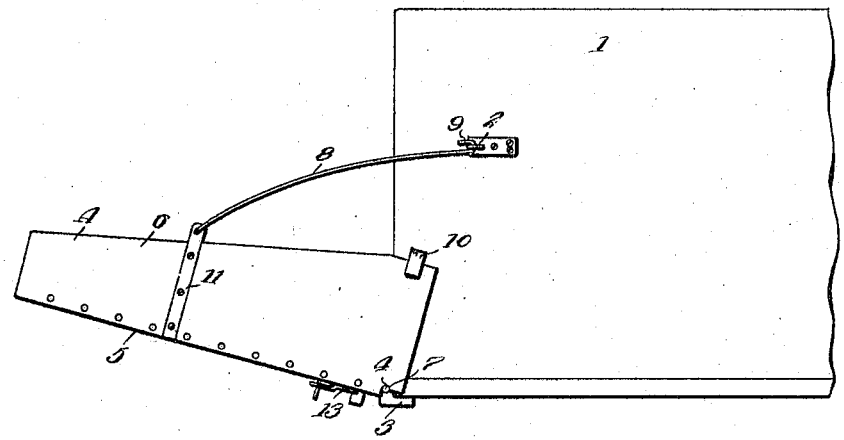
Albert E. Bright
INVENTOR
BY Victor J. Evans
ATTORNEY
WITNESS:

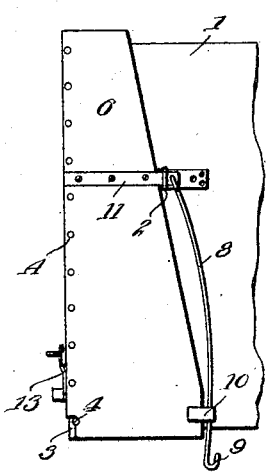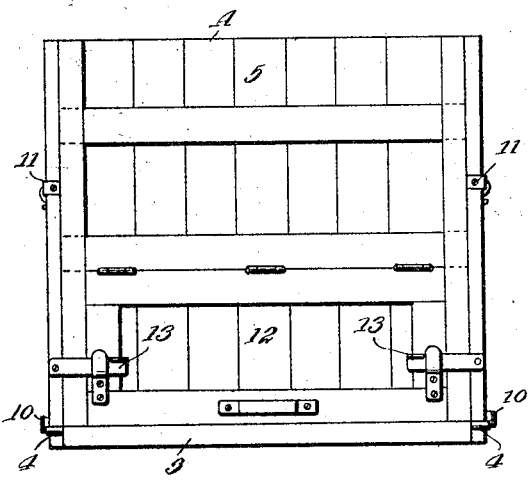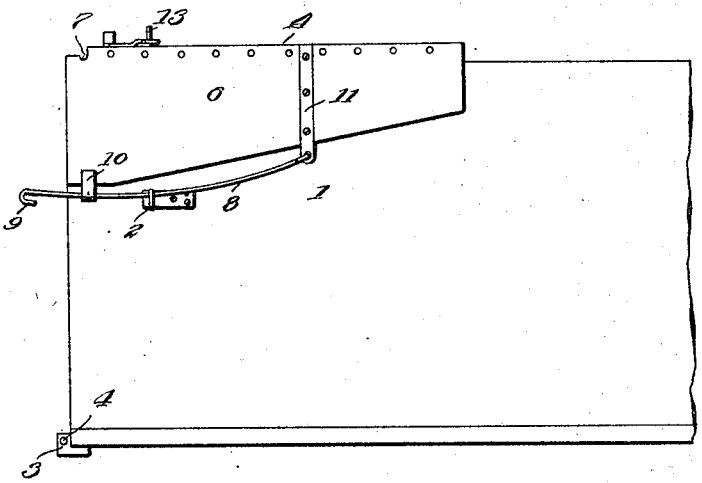

Patented May 1, 1923.

1,453,910

UNITED STATES PATENT OFFICE.

ALBERT E. BRIGHT, OF IDAGROVE, IOWA, ASSIGNOR OF ONE-HALF TO WILLIAM AUCHSTETTER, OF IDAGROVE, IOWA.

WAGON ATTACHMENT.

Application filed August 10, 1922. Serial No. 580,936.

*To all whom it may concern:*

Be it known that I, ALBERT E. BRIGHT, a citizen of the United States, residing at Idagrove, in the county of Ida and State of Iowa, have invented new and useful Improvements in Wagon Attachments, of which the following as a specification.

This invention relates to an end gate for vehicles, the general object of the invention being to make the gate in the form of a chute and to provide it with a hinged door whereby some of the material in the vehicle can be discharged without moving the gate.

Another object of the invention is to provide means for movably connecting the gate with the vehicle so that it can be placed in various positions in relation to the end of the vehicle.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of a portion of a wagon body showing my invention in use.

Figure 2 is a side view showing the gate in closed position.

Figure 3 is a similar view showing the gate in open position.

Figure 4 is an end view.

Figure 5 is a side view showing the gate upon the top of the box.

In these views 1 indicates the wagon body which has a swiveled eye 2 on each side thereof and which has a cross bar 3 at the end of its bottom, the ends of the bar projecting beyond the sides of the wagon, said projecting ends being rounded, as at 4. The end gate is shown at A and said gate consists of the bottom 5 and the tapered sides 6. The outer lower corner of each side is notched, as at 7, to engage the rounded ends 4 so that the end gate can swing around the said bar 3. Links 8 are pivotally connected with the sides 6 and these links pass through the eyes 2 and have hooked ends 9 for engaging the eyes when the end gate is in tilted position, as shown in Figure 3. These links are adapted to hold the gate in closed position, as shown in Figure 2, by having their inner ends engaging the eyes and their other end parts engaging the catches 10 on the sides 6 of the gate. I prefer to pivot the links to the sides of the gate by means of the straps 11 which are bolted or otherwise secured to the said sides. The links will also permit the end gate to be shoved upwardly upon the top edges of the wagon body so as to entirely uncover the end of the body, as shown in Figure 5. The bottom 5 of the gate is formed in part of a hinged door 12 which is adapted to be held in closed position by the latches 13. A strip 14 is hinged to the lower inner edge of the door to engage the bottom of the body to make a grain tight joint. A part of the strip fits within the body so that the gate will overlap the end edges of the body and thus make a grain tight connection therewith.

A wagon body provided with this gate can be used for hauling shelled corn or ear corn and small grain of all kind. The hinged door permits easy unloading and if the body is to be unloaded by hand the gate can be moved outwardly into inclined position so as to provide a scoop board. If the wagon is to be used for hauling hogs the gate is shoved upon the top of the wagon box to permit the hogs to pass through the end of the box.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a wagon box, an end gate consisting of bottom and side parts, a hinged door in the bottom, latch means for the same, a hinged flap at the bottom of the door for engaging the end edge of the bottom of the box, links pivoted to the sides of the gate, swiveled eyelets on the sides of the wagon box for receiving said links, said links having their outer ends of hook-shape, latches on the sides of the gate for receiving parts of the links to hold the gate in closed position, projections at the sides of the box and notches in the sides of the gate for engaging the projections for swingingly supporting the gate upon the box.

In testimony whereof I affix my signature.

ALBERT E. BRIGHT.